(12) United States Patent
Goldstein et al.

(10) Patent No.: US 10,429,114 B2
(45) Date of Patent: Oct. 1, 2019

(54) ICE-MAKING MACHINE AND HEAT EXCHANGER THEREFOR

(71) Applicant: SUNWELL ENGINEERING COMPANY LIMITED, Woodbridge (CA)

(72) Inventors: Vladimir Goldstein, Woodbridge (CA); Alexander Chong, Woodbridge (CA)

(73) Assignee: Sunwell Engineering Company Limited, Woodbridge, Ontario (CA)

( * ) Notice: Subject to any disclaimer, the term of this patent is extended or adjusted under 35 U.S.C. 154(b) by 0 days.

(21) Appl. No.: 15/522,078

(22) PCT Filed: Nov. 6, 2015

(86) PCT No.: PCT/CA2015/051148
§ 371 (c)(1),
(2) Date: Apr. 26, 2017

(87) PCT Pub. No.: WO2016/070284
PCT Pub. Date: May 12, 2016

(65) Prior Publication Data
US 2017/0336121 A1    Nov. 23, 2017

Related U.S. Application Data

(60) Provisional application No. 62/076,549, filed on Nov. 7, 2014.

(51) Int. Cl.
*F25C 1/145* (2018.01)
*A23G 9/22* (2006.01)
(Continued)

(52) U.S. Cl.
CPC ............... *F25C 1/145* (2013.01); *A23G 9/22* (2013.01); *F25C 1/14* (2013.01); *F28D 7/0025* (2013.01);
(Continued)

(58) Field of Classification Search
CPC .......... F25C 1/145; F25C 1/142; F25C 1/147; F25C 1/14; F28F 1/105; F28F 21/084;
(Continued)

(56) References Cited

U.S. PATENT DOCUMENTS 4,760,710 A * 8/1988 Takagi .................... F25C 1/145
165/133
4,796,441 A * 1/1989 Goldstein ............. F25B 29/003
165/94
(Continued)

FOREIGN PATENT DOCUMENTS

| EP | 1031807 | 8/2000 |
| WO | 9727438 | 7/1997 |
| WO | 2013/070450 | 5/2013 |

OTHER PUBLICATIONS

Extended EP Search Report and Opinion dated Jun. 11, 2018 in EP 1585556803.0.
(Continued)

*Primary Examiner* — Emmanuel E Duke
(74) *Attorney, Agent, or Firm* — Faegre Baker Daniels LLP (57) ABSTRACT

A heat exchanger for an ice-making machine comprises a generally cylindrical, tubular body defining a generally cylindrical, internal heat exchange surface, and at least one refrigerant circuit comprising at least one refrigerant passage disposed about the outer surface of the tubular body, at least a portion of the refrigerant circuit being brazed to the outer surface of the tubular body.

9 Claims, 13 Drawing Sheets

(51) Int. Cl.
| | |
|---|---|
| *F25C 1/14* | (2018.01) |
| *F28F 1/40* | (2006.01) |
| *F28F 21/08* | (2006.01) |
| *F28D 7/00* | (2006.01) |
| *F28D 7/10* | (2006.01) |
| *F28F 1/10* | (2006.01) |
| *F25B 39/02* | (2006.01) |

(52) U.S. Cl.
CPC .............. *F28D 7/106* (2013.01); *F28F 1/105* (2013.01); *F28F 1/40* (2013.01); *F28F 21/084* (2013.01); *F25B 39/02* (2013.01); *F28F 2275/04* (2013.01)

(58) Field of Classification Search
CPC ........ F28F 1/40; F28F 2275/04; F28F 19/008; F28F 13/18; F28D 7/106; F28D 7/0025; A23G 9/22; F25B 39/02
See application file for complete search history.

(56) References Cited

U.S. PATENT DOCUMENTS 6,286,332 B1 * 9/2001 Goldstein ................ A23G 7/02
165/133
2014/0305618 A1 * 10/2014 Newton .................. F28D 7/106
165/154

OTHER PUBLICATIONS

International Search Report and Written Opinion dated Feb. 10, 2016 in PCT/CA2015/051148.

* cited by examiner

ICE-MAKING MACHINE AND HEAT EXCHANGER THEREFOR

CROSS-REFERENCE TO RELATED APPLICATION

The present application is a National Stage of International Application No. PCT/CA2015/051148, filed Nov. 6, 2015, which claims priority to U.S. Provisional Application No. 62/076,549, filed Nov. 7, 2014, the entire disclosures of which are hereby expressly incorporated herein by reference.

FIELD

The subject application relates to ice-making machines and in particular to a heat exchanger for an ice-making machine and to an ice-making machine incorporating the same.

BACKGROUND

Ice-making machines are well known in the art and many designs have been considered. For example, U.S. Pat. No. 4,796,441 to Goldstein discloses an ice-making machine comprising a housing having a cooled wall. A eutectic mixture is passed across the wall to be cooled below its freezing point and form ice. A blade continuously wipes the wall to move the fluid away from the wall and into the body of the fluid. The blades are moved by a drive means at a rate such that the surface is wiped prior to crystallization of the ice on the wall.

U.S. Pat. No. 6,286,332 to Goldstein discloses an ice-making machine comprising a heat exchanger including a generally cylindrical, tubular body defining a generally cylindrical internal surface. The body is formed of corrodible material and has at least one refrigerant passage extending therethrough. End plates are provided at opposite ends of the body. A refrigerant inlet delivers refrigerant to the at least one refrigerant passage and a refrigerant outlet collects refrigerant having passed through the at least one refrigerant passage. An inlet delivers fluid from which ice is to be made into the body to permit the refrigerant to extract heat from the fluid and an outlet permits the egress of ice from the body. A cylindrical sleeve lines the internal surface and is formed from generally non-corrodible material. At least one blade is in contact with the sleeve and is movable about an axis to move across the sleeve and remove cooled fluid therefrom. A drive moves the at least one blade across the sleeve.

Although various ice making machines have been considered, improvements are desired. It is therefore an object at least to provide a novel heat exchanger for an ice-making machine and a novel ice-making machine incorporating the same.

SUMMARY

Accordingly, in one aspect there is provided a heat exchanger for an ice-making machine comprising a generally cylindrical, tubular body defining a generally cylindrical, internal heat exchange surface, and at least one refrigerant circuit comprising at least one refrigerant passage disposed about the outer surface of the tubular body, at least a portion of the refrigerant circuit being brazed to the outer surface of the tubular body.

In an embodiment, the at least one refrigerant passage is defined by a plurality of axially extending members circumferentially disposed about the outer surface of the tubular body. In another embodiment, the at least one refrigerant passage is defined by a plurality of radially extending members circumferentially disposed about the outer surface of the tubular body.

According to another aspect there is provided an ice-making machine, comprising a housing having an inlet to receive a fluid from which ice is to be made and an outlet to permit the egress of ice from said housing, a heat exchanger having a generally cylindrical, tubular body forming part of said housing, the tubular body defining at least one heat exchange surface, the heat exchanger comprising at least one refrigerant circuit comprising at least one refrigerant passage disposed about the outer surface of the tubular body, at least a portion of the refrigerant circuit being brazed to the outer surface of the tubular body, at least one blade in contact with the at least one heat exchange service and movable about an axis to move across the at least one heat exchange surface and remove cooled fluid therefrom, and a drive to move the at least one blade across the at least one heat exchange surface.

According to another aspect there is provided a method of brazing a plurality of members made of a metallic material to a heat exchange surface, comprising roughening the heat exchange surface, spraying the roughened heat exchange surface with a powered material, at least a portion of which comprises a material that is the same as the metallic material, mechanically securing the plurality of members to the sprayed heat exchange surface, placing the heat exchange surface and plurality of members in a brazing temperature environment, and allowing the heat exchange surface and plurality of members to cool.

BRIEF DESCRIPTION OF THE DRAWINGS

Embodiments will now be described more fully with reference to the accompanying drawings in which.

DETAILED DESCRIPTION OF THE EMBODIMENTS

Figure 1:
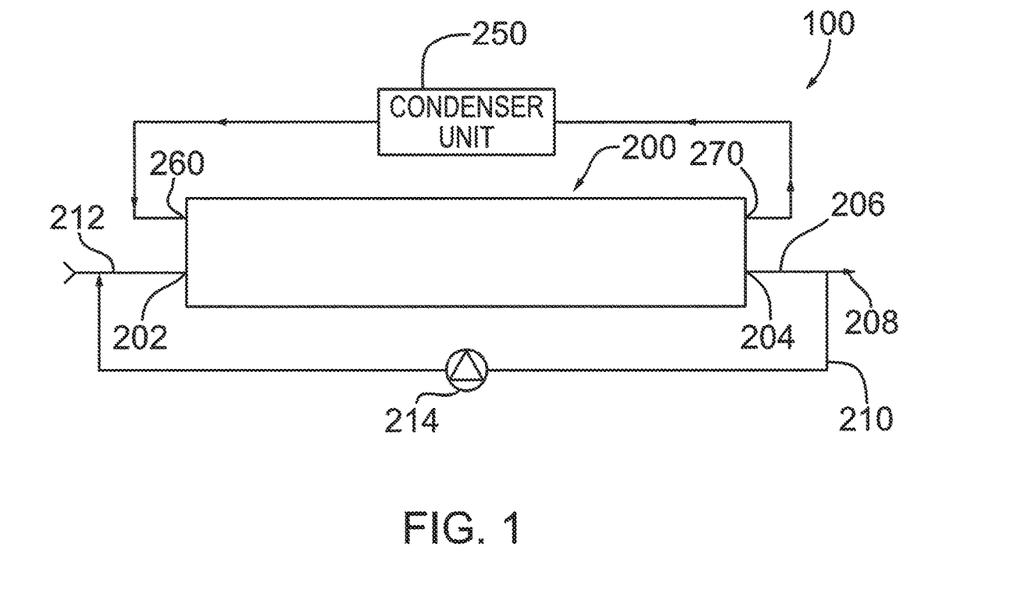
FIG. 1 is a schematic diagram of an ice-making unit.

Turning now to FIG. 1, an ice-making unit is shown and is generally identified by reference numeral 100. The ice-making unit 100 comprises an ice-making machine 200 having a brine solution inlet 202 and an ice-brine slurry outlet 204. The brine-slurry inlet 202 permits the ingress of brine solution or ice-brine slurry received from a brine source (not shown) into the ice-making machine 200. The ice-brine slurry outlet 204 permits the egress of ice-slurry brine from the ice-making machine 200. The ice-brine slurry outlet 204 is connected to a discharge conduit 206. Discharge conduit 206 leads to an outlet 208 as well as to a recirculation conduit 210. Recirculation conduit 210 leads to an inlet conduit 212 which also receives brine solution. The inlet conduit 212 supplies brine solution and/or ice-brine slurry to the brine solution inlet 202. A pump 214 is positioned along the recirculation conduit 210 to recirculate ice-brine slurry. The amount of brine solution entering the inlet conduit 212 and mixing with the recirculated ice-brine slurry can be controlled to allow the ice fraction of ice-brine slurry produced by the ice-making unit 100 to be adjusted as desired.

The ice-making unit 100 comprises a condenser unit 250. The condenser unit 250 is configured to supply the ice-making machine 200 with a refrigerant by way of a refrigerant inlet 260. The condenser unit 250 is configured to compress and condense refrigerant exciting the ice-making machine by way of a refrigerant outlet 270 before recirculating the refrigerant to the refrigerant inlet 260.

Figure 2:
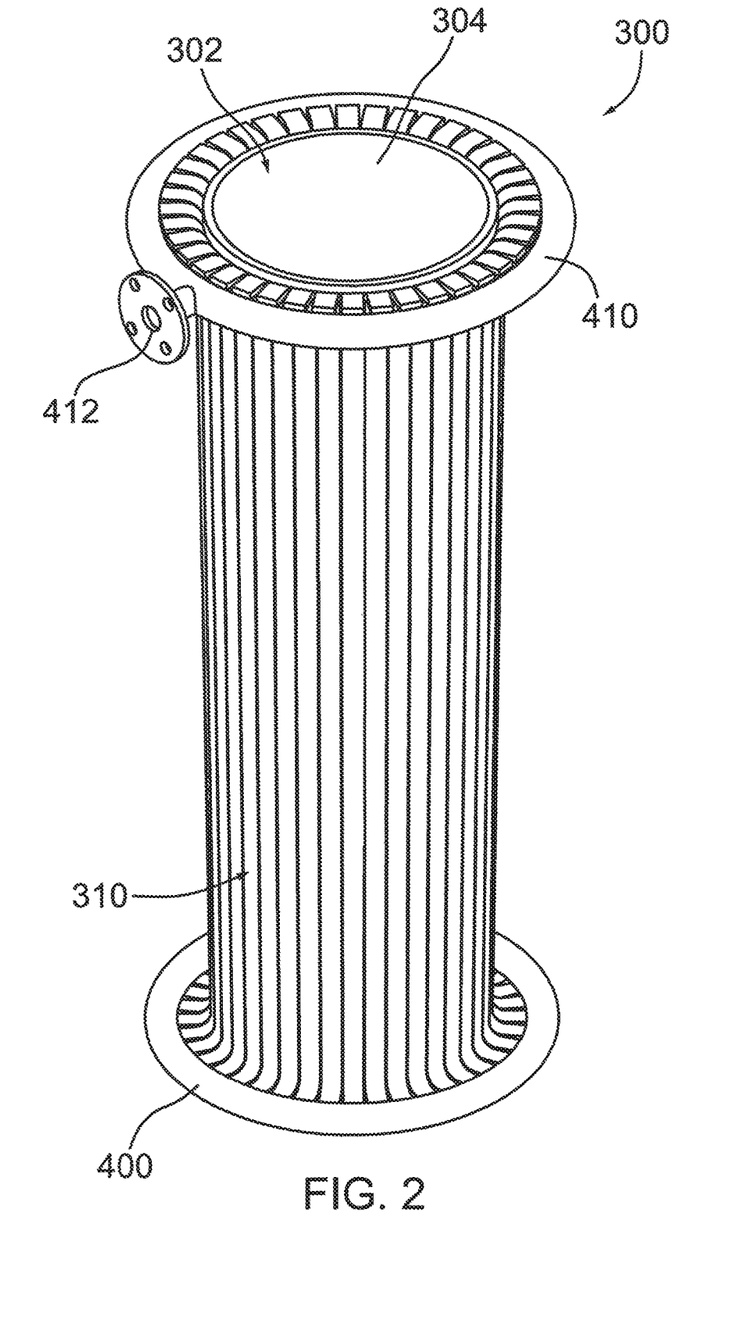
FIG. 2 is an isometric view of a heat exchanger forming part of the ice-making unit of FIG. 1.

As shown in FIG. 2, the ice-making machine 200 comprises a heat exchanger 300. The heat exchanger 300 comprises a generally cylindrical, tubular body 302 that defines a generally cylindrical, internal heat exchange surface 304. An inlet header 400 is connected to a bottom surface of the heat exchanger body 302. An outlet header 410 is connected to a top surface of the heat exchanger body 302. A refrigerant circuit 310 is connected to and circumscribes the outside of the heat exchanger body 302. The refrigerant circuit is fluidly coupled to the inlet header 400 and outlet header 410.

The inlet header 400 is generally ring-shaped and defines a circular inlet passage. The inlet header 400 comprises an inlet (not shown) configured to direct the ingress of refrigerant received by way of the refrigerant inlet 260 about the circular inlet passage.

The outlet header 410 is generally ring-shaped and defines a circular outlet passage. The outlet header 410 comprises an outlet 412 configured to direct the egress of refrigerant out of the outlet passage by way of the refrigerant outlet 270.

Figure 3A:
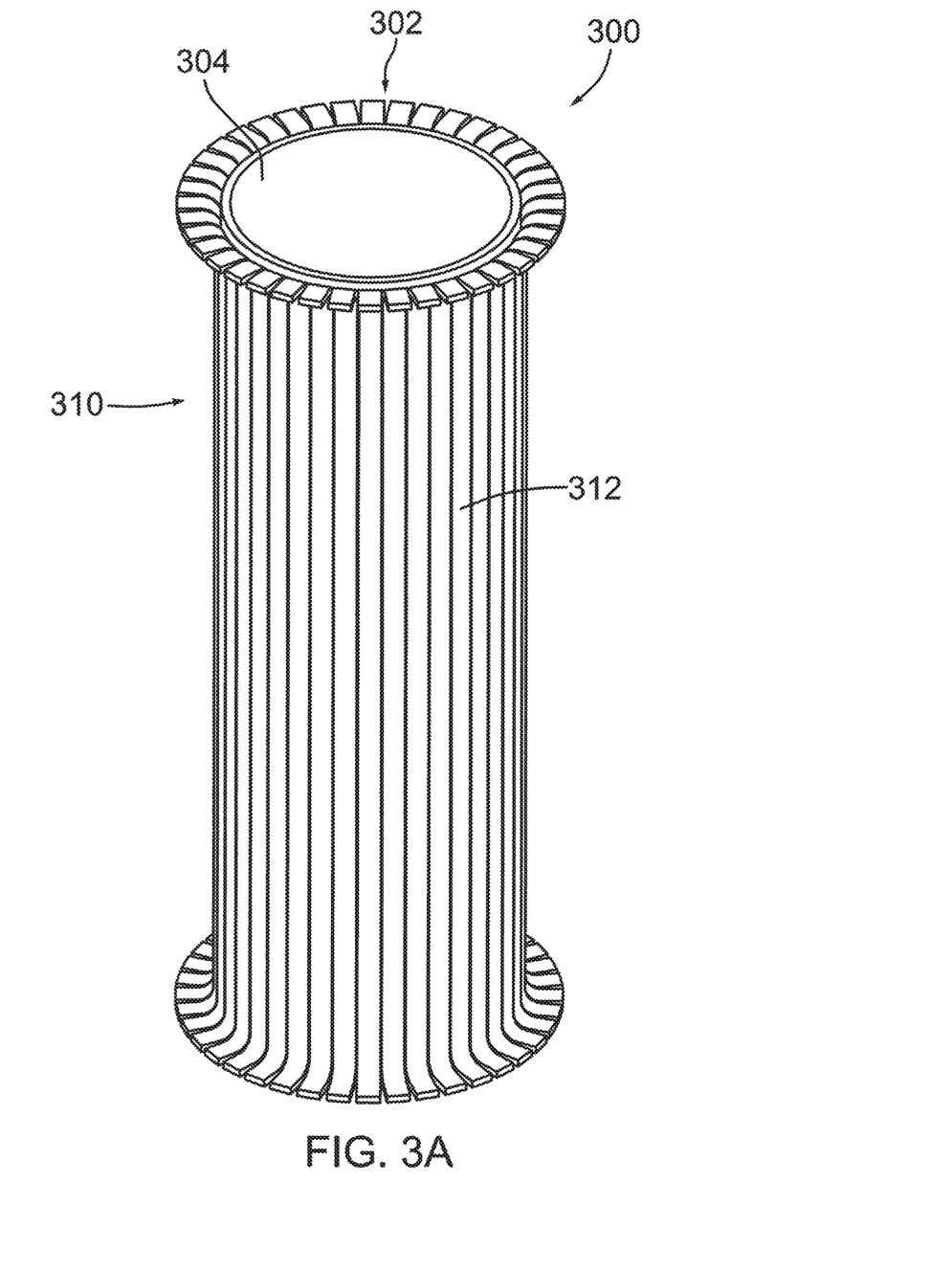
FIGS. 3A and 3B are isometric and front plan views, respectively, of a refrigerant circuit forming part of the heat exchanger of FIG. 2.
Figure 3B:
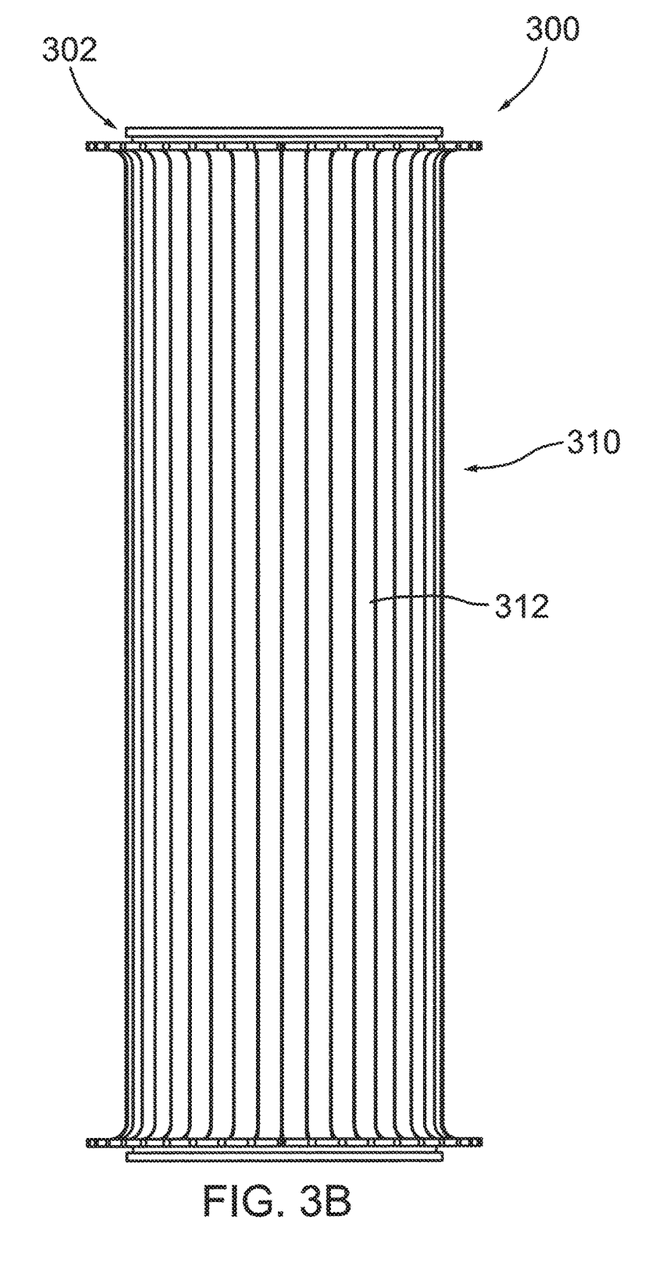
Figure 4A:
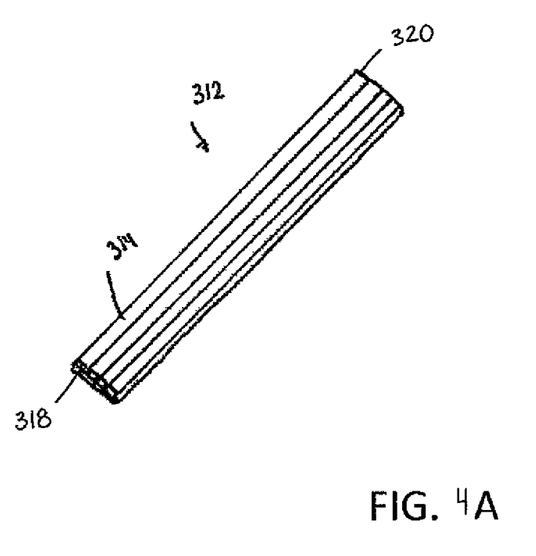
FIGS. 4A and 4B are isometric and top plan views, respectively, of an axially extending member forming part of the refrigerant circuit of FIGS. 3A and 3B.
Figure 4B:
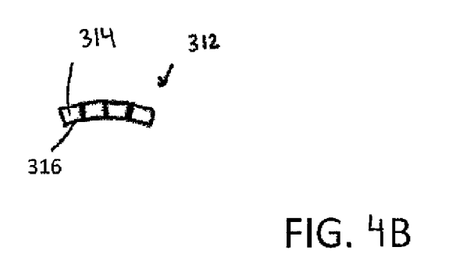

As shown in FIGS. 3A and 3B, the refrigerant circuit 310 comprises a plurality of axially extending members 312 circumferentially disposed about the outer surface of the heat exchanger body 302. One of the axially extending members 312 is shown in FIGS. 4A and 4B. In this embodiment, each axially extending member 312 is dimensioned to extend the length of the heat exchanger body 302 between the inlet header 400 and outlet header 410. As shown in FIG. 4B, each axially extending member 312 comprises a surface 316 having an arcuate shape. The surface 316 is arched such that the entire surface 316 is in contact with the outside surface of the heat exchanger body 302 when brought into contact therewith. Each axially extending member 312 comprises refrigerant passages 314, in this embodiment four (4), that extend the entire length thereof. Each refrigerant passage 314 comprises an inlet 318 and an outlet 320. The inlet 318 is configured to be fluidly coupled to the inlet header 400 and the outlet 320 is configured to be fluidly coupled to the outlet header 410.

The surface 316 of each axially extending member 312 is connected to the outer surface of the heat exchanger body 302 via brazing. As will be appreciated, brazing the surface 316 of each axially extending member 312 to the outer surface of the heat exchanger body 302 ensures a high rate of heat transfer during operation.

In this embodiment, the brazing process comprises four steps. A sandblasting process is used to roughen the outer surface of the heat exchanger body 302. A thermal spray such as for example Iconel™ is applied to the roughened surface of the heat exchanger body 302. A wire arc thermal spraying process is used to spray a melted aluminum powder on the thermal sprayed surface of the heat exchanger body 302, thereby creating an aluminum layer on the outer surface of the heat exchanger body 302. The axially extending members 312 are then mechanically secured onto the outer surface of the heat exchanger body 302 using gear clamps. The axially extending members 312 and heat exchanger body 302 are then placed into a vacuum oven set at approximately 600° C. for brazing for a predetermined amount of time. The gear clamps are removed and the heat exchanger body 302 and axially extending members 312 are placed in a room temperature environment, allowing them to cool.

Although not shown, the ice-making machine 200 comprises a blade assembly (not shown) positioned within the heat exchanger body 302 comprising an arrangement of blades and spacers. The blade assembly is rotated by a motor via a drive shaft (not shown). The blades are in contact with the heat exchange surface, as will be described below. Specific details of the blade assembly, motor and drive shaft are described in U.S. Pat. No. 4,796,441, the relevant portions of the disclosure of which are incorporated herein by reference.

The operation of the ice-making unit 100 will now be described. In operation, brine solution or ice-brine slurry (hereinafter referred to as brine solution) is fed into the ice-making machine 200 through the brine solution inlet 202. The brine solution flows adjacent the heat exchange surface 304. While this is occurring, refrigerant flows into the inlet header 400 and into each of the refrigerant passages 314 by way of the inlets 318. The refrigerant flows along the refrigerant passages 314 and exits into the outlet header 410 by way of the outlets 320. As the refrigerant flows through the refrigerant passages 314, the refrigerant absorbs heat through the heat exchange surface 304 and boils. The brine solution in contact with the heat exchange surface 304 is thus supercooled.

To avoid deposition of ice on the heat exchange surface 304, which would inhibit heat transfer to the refrigerant and thereby reduce the efficiency of the ice-making unit 100, the blade assembly is rotated by the motor driven drive shaft. Specifically, the blade assembly is rotated at a rate of speed that is fast enough to allow the blades to remove the supercooled brine solution from the heat exchange surface 304 prior to crystallization of ice crystals on the heat exchange surface 304. The supercooled brine solution therefore crystallizes in the brine solution allowing the brine solution to act as a secondary refrigerant in the formation of fine ice crystals throughout the brine solution.

As those skilled in the art will appreciate, ice-making unit 100 allows fine ice particles in a brine solution to be made efficiently by increasing and equalizing heat transfer between the brine solution and the refrigerant over basically the entire heat exchange surface 304.

Although in the embodiment above the refrigerant circuit is described as comprising a plurality of axially extending members, those skilled in the art will appreciate that in embodiments, the refrigerant circuit may comprise a plurality of radially extending members.

Although in the embodiment above the heat exchanger is described as comprising a refrigerant circuit comprising a plurality of axially extending members circumferentially disposed about the outer surface of the heat exchanger body, those skilled in the art will appreciate that alternative heat exchangers may be used.

Figure 5A:
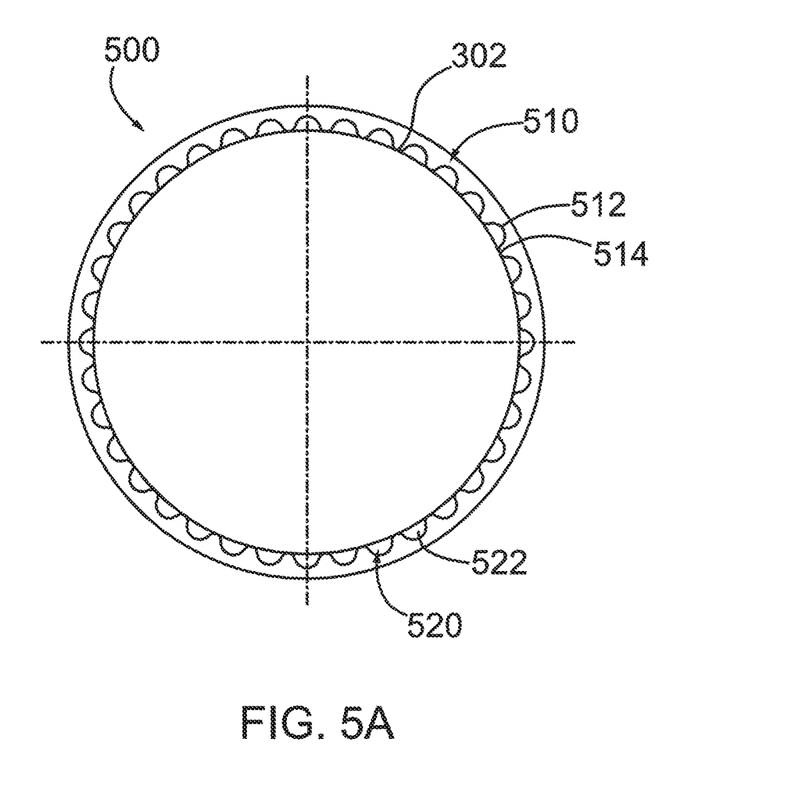
FIGS. 5A and 5B are top plan and isometric views of another embodiment of a heat exchanger.
Figure 5B:
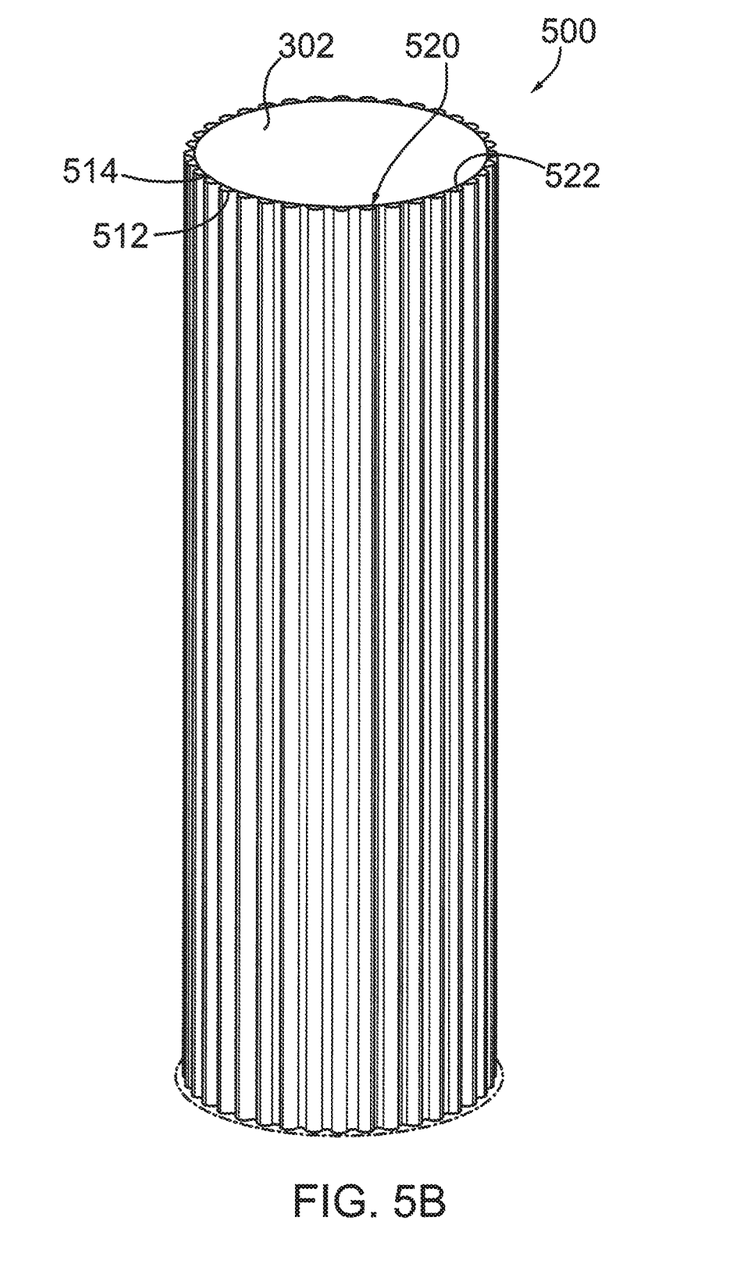

Turning now to FIGS. 5A and 5B, another embodiment of a heat exchanger for use with ice-making unit 100 is shown and is generally identified by reference numeral 500. The heat exchanger 500 is generally similar to that of heat exchanger 300, and as such like reference numerals will be used to indicate like components. In this embodiment, a sleeve 510 made of corrugated aluminum is positioned around the circumference of the heat exchanger body 302. As can be seen, the corrugations of the sleeve 510 are sinusoidal-shaped and comprise peaks 512 and valleys 514. The sleeve 510 is dimensioned such that the valleys 514 contact the outer surface of the heat exchanger body 302. The valleys 514 are connected to the outer surface of the heat exchanger body 302 via brazing. As will be appreciated, brazing the valleys 514 of the outer sleeve 510 ensures a high rate of heat transfer during operation.

A refrigerant circuit 520 is defined by a plurality of axially extending passages 522 formed between the corrugations of the sleeve 510 and the outer surface of the heat exchanger body 302. Although not shown, an inlet header is connected to a bottom surface of the heat exchanger body 302 and an outlet header is connected to a top surface. One end of each axially extending passage 522 is fluidly coupled to the inlet header and the opposing end of each axially extending passage 522 is fluidly coupled to the outlet header.

The operation of the heat exchanger 500 is generally similar to that as the heat exchanger 300 and as such the details will not be described.

Figure 6A:
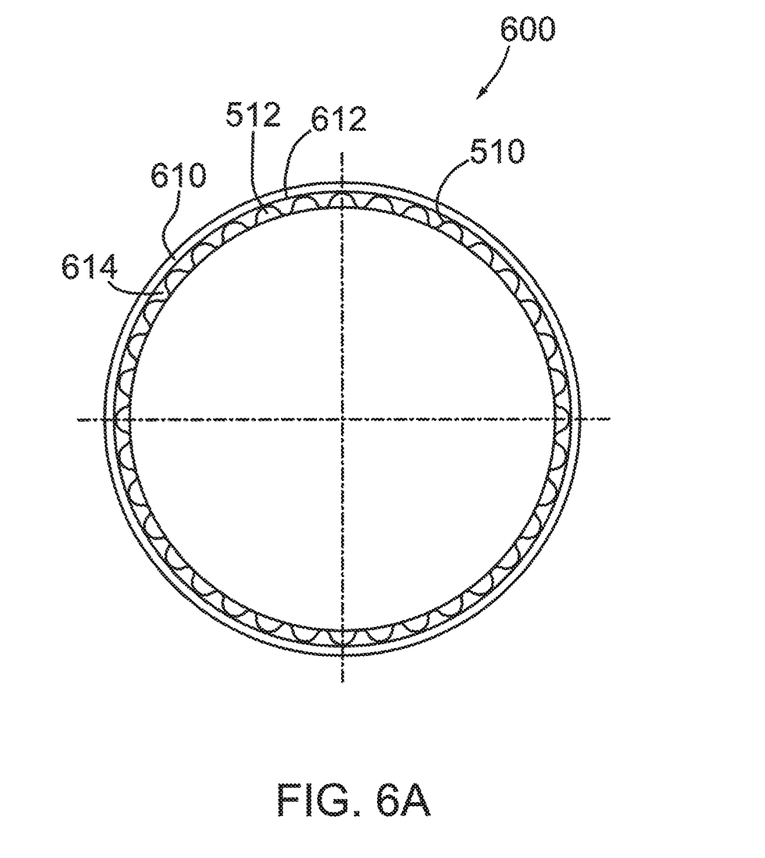
FIGS. 6A and 6B are top plan and isometric views of yet another embodiment of a heat exchanger.
Figure 6B:
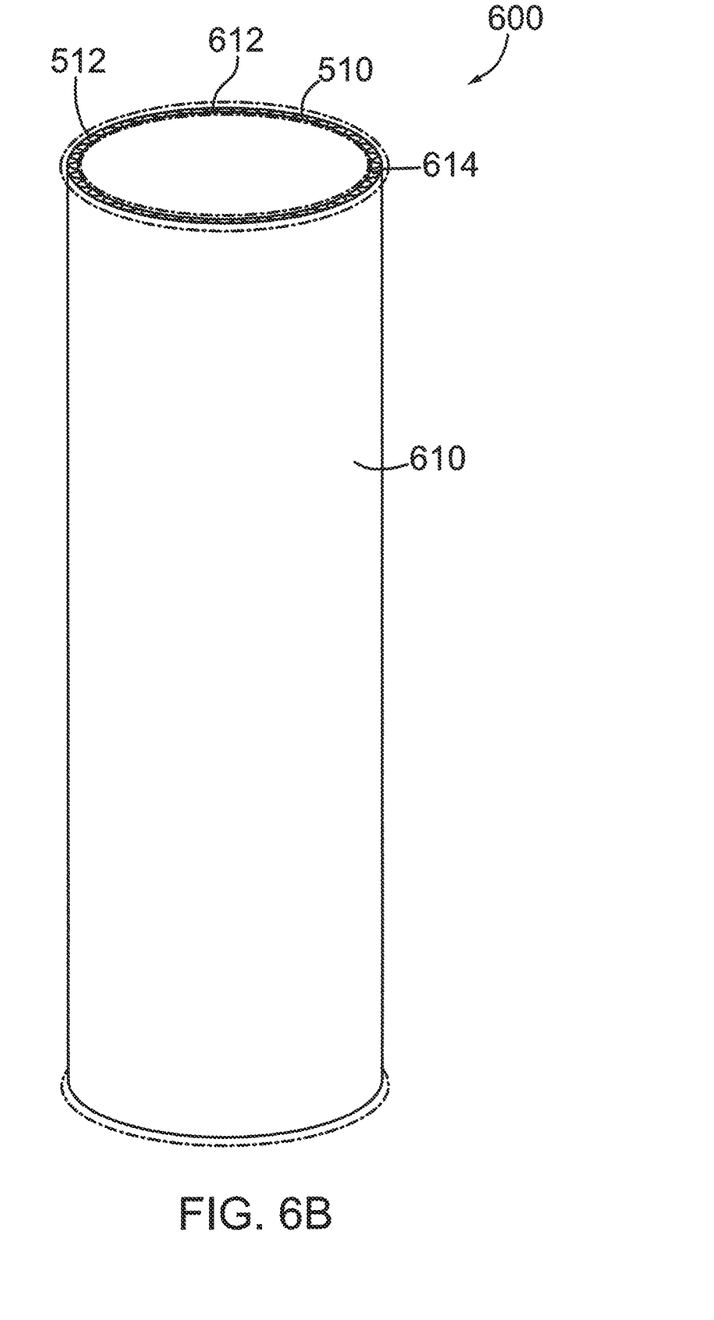

Turning now to FIGS. 6A and 6B, another embodiment of a heat exchanger for use with the ice-making unit 100 is shown and is generally identified by reference numeral 600. The heat exchanger 600 is generally similar to that of heat exchanger 500, and as such like reference numerals will be used to indicate like components. In this embodiment, an outer sleeve 610 made of aluminum is positioned around the sleeve 510 of corrugated aluminum. The outer sleeve 610 is dimensioned such that an inner surface 612 of the outer sleeve 610 contacts the peaks 512 of the sleeve 510. The inner surface 612 is connected to the peaks 512 of the sleeve 510 via brazing. As a result, a plurality of axially extending passages 614 are formed between the corrugations of the sleeve 510 and the inner surface 612 of the outer sleeve 610. The plurality of axially extending passages 614 may be filled with an insulating material such as for example expanding polyurethane foam.

Figure 7A:
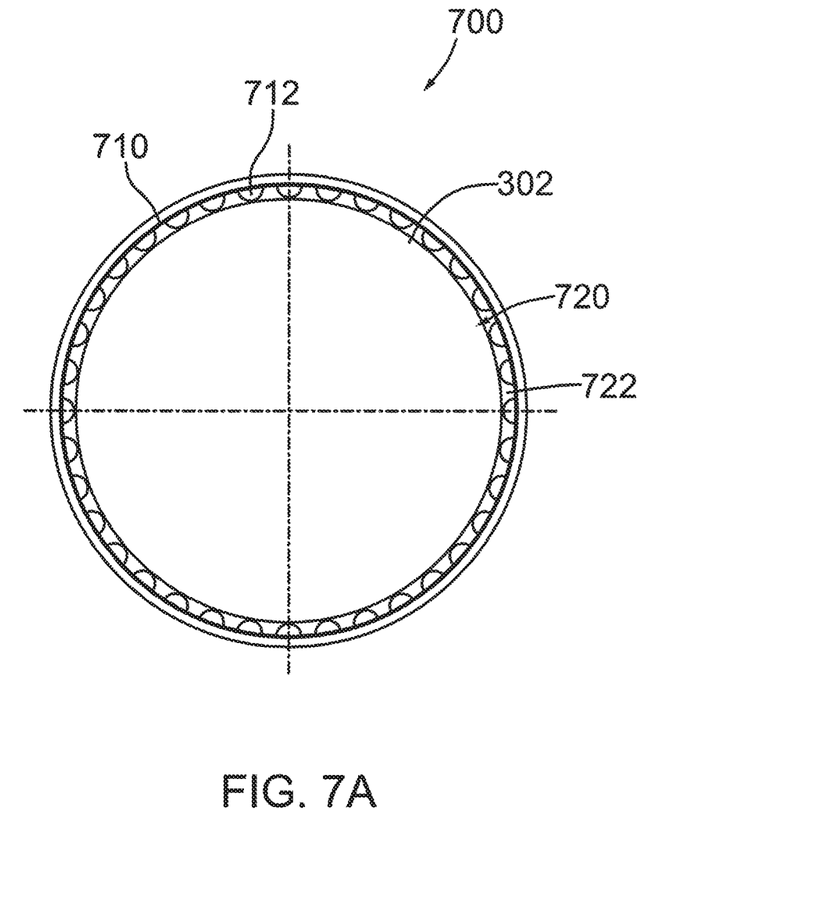
FIGS. 7A and 7B are top plan and isometric views of yet another embodiment of a heat exchanger.
Figure 7B:
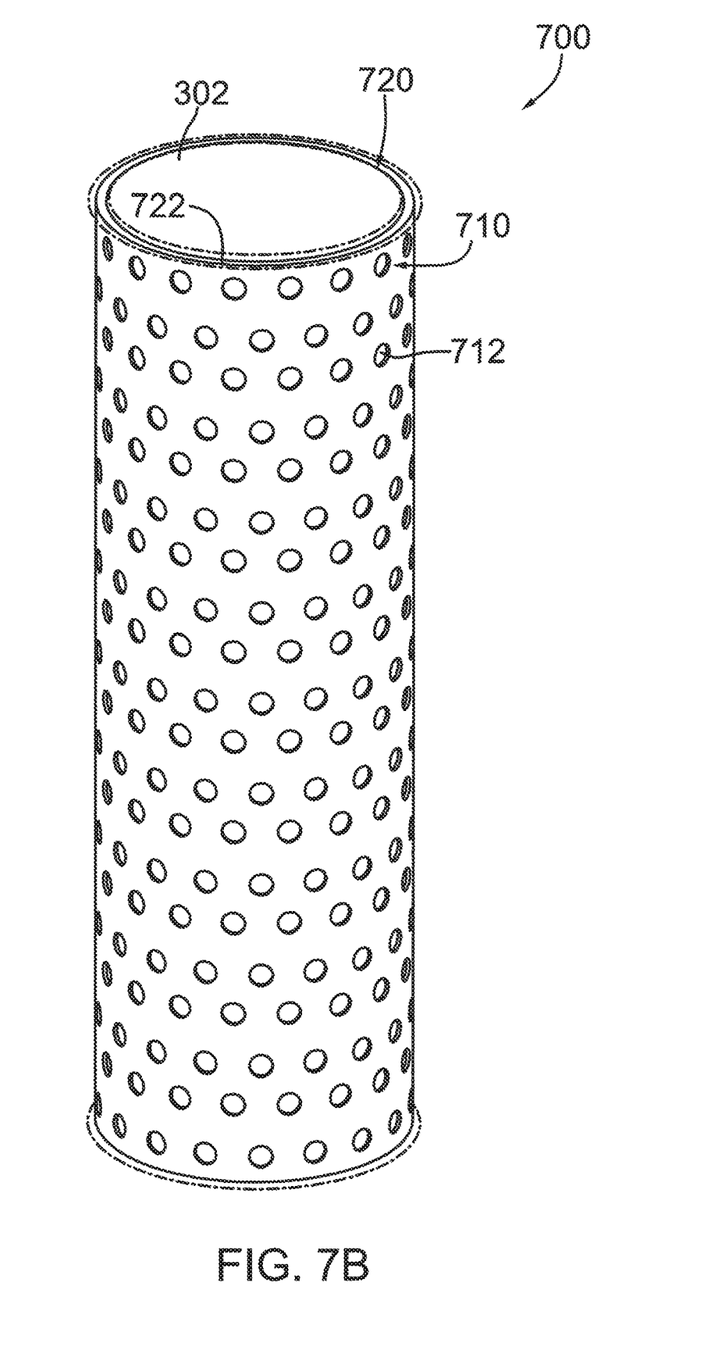

Turning now to FIGS. 7A and 7B, another embodiment of a heat exchanger for use with the ice-making unit 100 is shown and is generally identified by reference numeral 700. The heat exchanger 700 is generally similar to that of heat exchanger 300, and as such like reference numerals will be used to indicate like components. In this embodiment, a sleeve 710 made of aluminum is positioned around the circumference of the heat exchanger body 302. The sleeve 710 comprises a plurality of circular dimples 712 that extend generally towards the heat exchanger body 302. The sleeve 710 and dimples 712 are dimensioned such that the dimples 712 contact the outer surface of the heat exchanger body 302. The dimples 712 are connected to the outer surface of the heat exchanger body 302 via brazing.

A refrigerant circuit 720 is defined by refrigerant passages 722 formed between the sleeve 710 and the outer surface of the heat exchanger body 302. As such, the flow of refrigerant through the refrigerant passages 722 is directed by the dimples 712. Although not shown, an inlet header is connected to a bottom surface of the heat exchanger body 302 and an outlet header is connected to a top surface. One end of the refrigerant passages 722 is fluidly coupled to the inlet header and the opposing end of the refrigerant passages 722 is fluidly coupled to the outlet header.

The operation of the heat exchanger 700 is generally similar to that as the heat exchanger 300 and as such the details will not be described.

Figure 8:
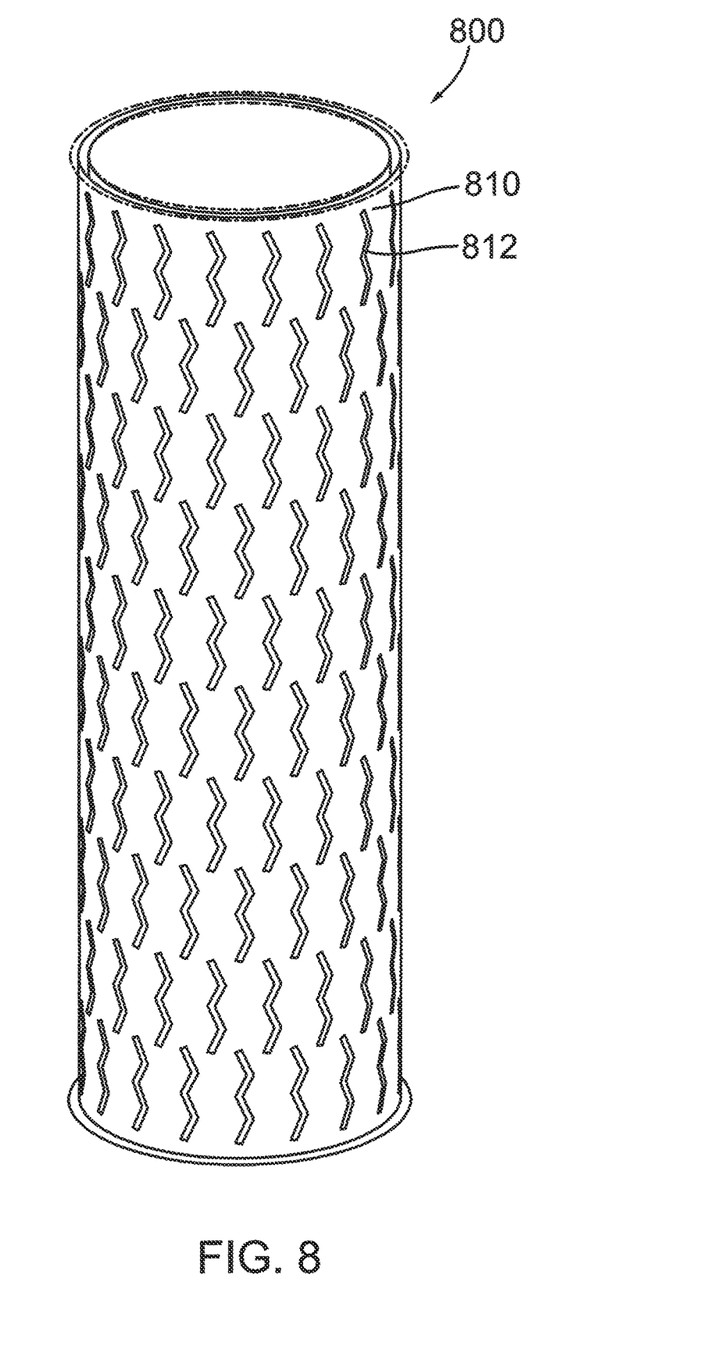
FIG. 8 is an isometric view of yet another embodiment of a heat exchanger.

Turning now to FIG. 8, another embodiment of a heat exchanger for use with the ice-making unit 100 is shown and is generally identified by reference numeral 800. The heat exchanger 800 is similar to heat exchanger 700, with the following exception. Rather than having circular dimples, the heat exchanger 800 comprises a sleeve 810 comprising a plurality of zig-zag shaped dimples 812.

Figure 9:
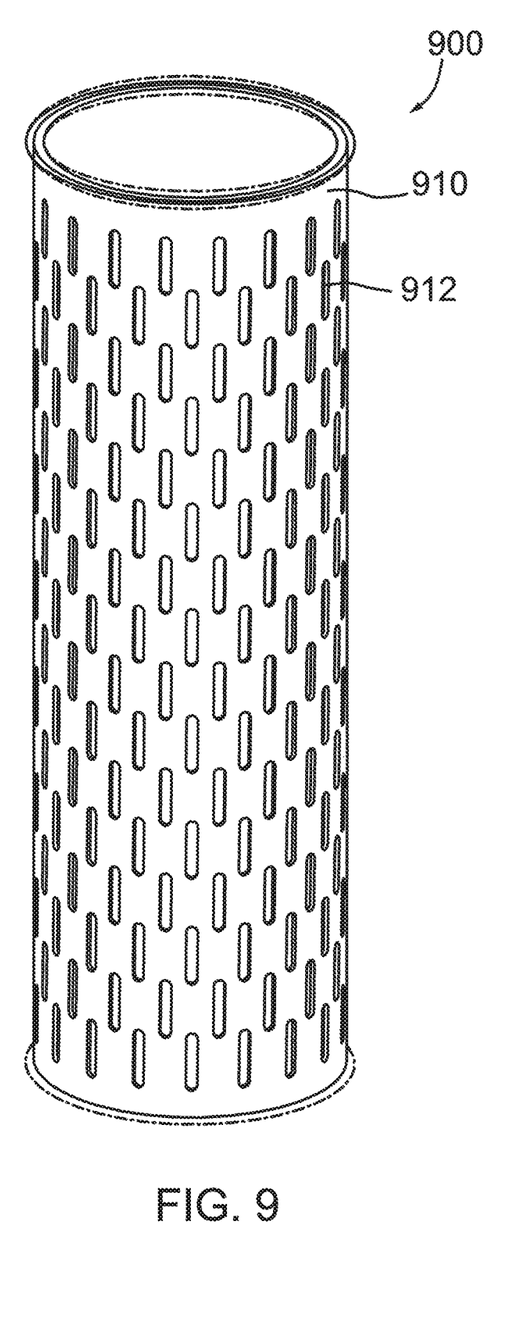
FIG. 9 is an isometric view of yet another embodiment of a heat exchanger.

Turning now to FIG. 9, another embodiment of a heat exchanger for use with the ice-making unit is shown and is generally identified by reference numeral 900. The heat exchanger 900 is similar to heat exchanger 700, with the following exception. Rather than having circular dimples, the heat exchanger 900 comprises a sleeve 910 comprising a plurality of rectangular dimples 912.

Although in embodiments above the dimples are described as being circular, zig-zag or rectangular shaped, those skilled in the art will appreciate that each one of the dimples may be any shape.

Although in embodiments above the sleeve and outer sleeve are described as being made of aluminum, those skilled in the art will appreciate that sleeve and outer sleeve may be made of other materials such as for example stainless steel.

Although embodiments have been described above with reference to the accompanying drawings, those of skill in the art will appreciate that variations and modifications may be made without departing from the scope thereof as defined by the appended claims.

What is claimed is:

1. An ice-making machine, comprising:
    a housing having an inlet to receive a fluid from which ice is to be made and an outlet to permit the egress of ice from said housing;
    a heat exchanger having a generally cylindrical, tubular body forming part of said housing, the tubular body defining at least one heat exchange surface, the heat exchanger comprising at least one refrigerant circuit disposed about the outer surface of the tubular body, the at least one refrigerant circuit defined by a plurality of axially extending members disposed about and brazed to the outer surface of the tubular body, each axially extending member having an arcuate shape and comprising a plurality of refrigerant passages extending the entire length thereof;
    at least one blade in contact with the at least one heat exchange surface and movable about an axis to move across the at least one heat exchange surface and remove cooled fluid therefrom; and
    a drive to move the at least one blade across the at least one heat exchange surface.

2. The ice-making machine of claim 1, wherein each refrigerant passage comprises an inlet and an outlet.

3. The ice-making machine of claim 2, further comprising:
    an inlet header defining a circular inlet passage in fluid communication with the inlet of each refrigerant passage.

4. The ice-making machine of claim 3, wherein the inlet header is configured to direct the ingress of refrigerant about the circular inlet passage and into the inlet of each refrigerant passage.

5. The ice-making machine of claim 1, further comprising:
   an outlet header defining a circular outlet passage in fluid communication with each refrigerant passage.

6. The ice-making machine of claim 5, wherein the outlet header is configured to direct the egress of refrigerant received from each refrigerant passage out of the circular outlet passage.

7. The ice-making machine of claim 1, wherein each axially extending member comprises four refrigerant passages.

8. The ice-making machine of claim 1, wherein an entire surface of each axially extending member is brazed to the outer surface of the tubular body.

9. The ice-making machine of claim 1, wherein each axially extending member is brazed to at least one bonding layer formed on the outer surface of the tubular body.

* * * * *